United States Patent [19]

Thornicroft et al.

[11] 3,838,777

[45] Oct. 1, 1974

[54] FRAMES FOR HOLDING PRINTED CIRCUIT BOARDS

[75] Inventors: Barry William Thornicroft, Winterbourne, Bristol; Maurice Royston Teal, Stroud, both of England

[73] Assignee: Critchley Bros. Limited, Brimscombe, Stroud, Gloucestershire, Great Britain

[22] Filed: July 3, 1972

[21] Appl. No.: 268,279

[30] Foreign Application Priority Data

July 5, 1971 Great Britain.................... 31384/71

[52] U.S. Cl.......... 211/41, 317/101 DH, 337/17 M, 337/66 M, 337/113 B

[51] Int. Cl.............................................. H02b 1/04

[58] Field of Search.......... 211/26, 41; 317/101 OH; 339/17 L, 17 M, 17 N, 65, 66 M, 17.6 MP

[56] References Cited

UNITED STATES PATENTS

| | | | |
|---|---|---|---|
| 1,936,963 | 11/1933 | Dutzmann | 339/113 B UX |
| 3,258,650 | 6/1966 | Fiege | 317/101 DH |
| 3,288,301 | 11/1966 | Kent et al. | 211/41 |
| 3,377,515 | 5/1968 | Erb | 317/101 DH |
| 3,511,385 | 5/1970 | Ayling | 339/17 M X |
| 3,691,430 | 9/1972 | Freitag | 211/41 |

FOREIGN PATENTS OR APPLICATIONS

| | | | |
|---|---|---|---|
| 1,149,420 | 5/1963 | Germany | 317/101 DH |

*Primary Examiner*—Marion Parsons, Jr.
*Assistant Examiner*—Thomas J. Holko
*Attorney, Agent, or Firm*—Elliott I. Pollock

[57] ABSTRACT

Special forms of supports and guides are provided in a frame construction, the guides being arranged for location between pairs of supports so that slots in the guides may receive edges of printed circuit boards. By forming each support with a rib, a groove at the end of each guide can be made a positive snap fit on the rib and for ease of location the support is more versatile if its cross-section is symmetrical. A symmetrical groove on the guide enables it to be located inverted or upright so that alternate cards may be in upper and lower rows. Spacer projections on the guides ensure correct spacing of abutting guides in the frame construction.

10 Claims, 11 Drawing Figures

FRAMES FOR HOLDING PRINTED CIRCUIT BOARDS

This invention relates to frame constructions as used for holding printed circuit boards or other generally flat plate-like electrical components.

The invention is concerned particularly with a frame construction of the type comprising two or more elongated parallel spaced support members, and a plurality of transverse guide members each with a groove or slot to receive an edge of one of the printed circuit boards, and having locating means at each opposite end thereof to cooperate with corresponding means on each of the support members, so as to provide support for the guide member. Such frame constructions will be referred to for convenience herein as "frame constructions of the type specified."

It is an object of the present invention to provide an improved frame construction of this general type which will provide certain advantages or added facilities, and possibly avoid certain disadvantages of existing designs.

Broadly stated from one aspect, the invention provides a frame construction of the type specified wherein the support members are each formed with a rib, and the guide members each have a corresponding groove at each end, for cooperation with the rib.

This arrangement with a male rib on each support member and a female groove on each guide member produces a number of unexpected advantages. It is possible, for example, to provide a snap-in connection to prevent the guide members being accidentally displaced, without distorting the support members as any one guide member is assembled, and thus possibly causing adjacent guide members to fall out of position. Also by designing the support member so as to be symmetrical about vertical and/or horizontal planes the guide members can be positioned in various alternative attitudes and positions.

The invention also consists in a frame construction of the type specified in which the support members and guide members are so designed that the guide members can be located on the support members in a normal or an inverted state so that printed circuit boards can be supported in alternative positions relative to the support members.

When the printed circuit boards are to be positioned at two different levels it is convenient that the guide members should be assembled so that alternate guide members in a row are respectively inverted or upright. In this arrangement the minimum gap or interval between guide members facing in one of the directions can be greater than when the guide members all face in the same direction and to allow for this difference in minimum spacing it is desirable that some form of spacer should be provided.

According to another aspect of the invention, therefore, in a frame construction of the type specified at least some of the guide members have spacer projections formed integral therewith, to abut against adjacent guide members and determine the spacing therebetween. Such spacer projections ideally comprise flanges displaced by a predetermined distance from the ends of the guide member and situated to the sides of and/or opposite to the groove or slot to receive the edge of a printed circuit board.

As an alternative method of achieving the positioning of printed circuit boards at two or more different levels, there is provided, in accordance with a further aspect of the invention, a frame construction of the type specified, wherein the guide members have a groove or slot provided in two opposite edges of the guide member.

From another aspect of the invention, in a frame construction of the type specified, each support member is formed with a similar groove or rib along two opposite sides thereof as the locating means. This allows a common extrusion to be used for the support members both at the front and rear of a frame and at different levels therein.

From another aspect of the invention, in a frame construction of the type specified cooperating groove and rib formations are provided on the support members and guide members, which formations are of undercut profile in cross-section, the rib formations having enlarged heads and the grooves having undercut lateral enlargements, to prevent unintentional withdrawal.

Conveniently the cooperating groove and rib formations are designed for snap-in assembly in a direction transverse to the length of each support member.

Also according to another aspect of the invention, in a frame construction of the type specified at least one of the support members has a rib along one face, and an identification strip having a groove to fit on the rib, or a plurality of C-type clips, carrying identification symbols, is/are located on the rib so that the symbols will be positioned adjacent respective ones of the guide members.

In any case the guide members and support members are preferably formed at least partly of a somewhat resilient material such as a synthetic plastic. The support members are preferably symmetrical both horizontally and vertically for the reasons stated and they may also be provided with an extruded longitudinal groove to receive a screw parallel to the length of the member, by which it is attached at each end to an end plate or other part of the frame.

The invention may be performed in various ways and embodiments thereof, with a number of possible modifications, will now be described by way of example with reference to the accompanying drawings, in which.

Comparable parts shown in the various Figures of the drawings will be provided throughout with the same reference numerals.

Figure 1:
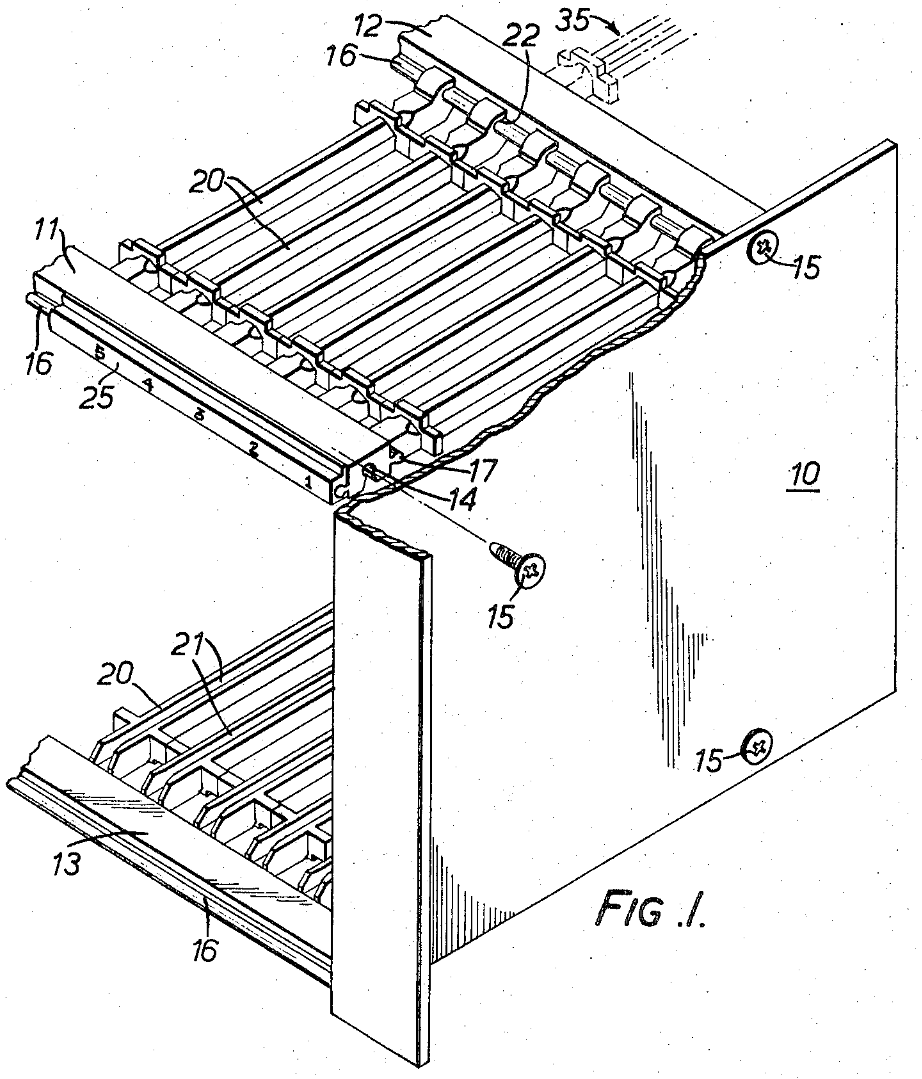
FIG. 1 is a general perspective view of part of a frame construction according to the invention.

Referring first to FIG. 1, the frame construction comprises a pair of end plates, one only of which is illustrated at 10, formed for example of a synthetic plastics material or sheet metal. Between these end plates extend four or more parallel support rails, two of the rails 11,12 being at an upper level and two like rails (only one of which is visible, at 13) positioned at a lower level. Each rail is an aluminum alloy or synthetic plastics extrusion and has a part-circular open groove 14 opening into its under surface to receive a fixing screw 15 driven into the groove through a hole in the respective end plate.

Figure 8:
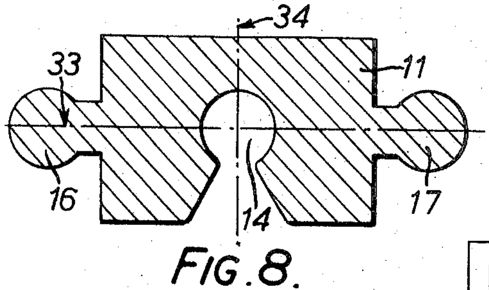
FIG. 8 is a detailed cross-section through one of the support rails.

All the support rails have exactly the same cross-section and can therefore be formed by a common extrusion process. As seen in FIG. 8 each rail has the open groove 14 with the entry point tapering towards an apex angle of 60°, in its underside and has a pair of ribs or beads 16,17 extending from each opposite vertical side face. Each of these ribs has an enlarged part-cylindrical head for a purpose to be described.

Figure 4:
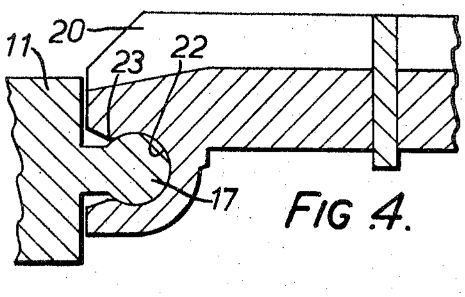
FIG. 4 is a detailed cross-section through the end of one of the guide members fitting on to the bead of one of the support rails.

Positioned on and between each pair of support rails (e.g. 11 and 12) at the upper and lower levels is a row of guide members or bars 20, formed of plastics material, each having a groove 21 in its downwardly or upwardly facing surface as the case may be. At each end the guide bar has a transverse slot or groove 22 with a slightly restricted entry mouth 23 formed with inclined flanks. Each of these grooves is designed to fit onto one of the ribs or beads 16,17 on a support rail as clearly seen in FIG. 4. Since the mouth 23 is slightly restricted the groove interlocks with the enlarged head on the bead and the resilience of the plastics material produces a snap-in effect so that the guide bar can be introduced into position transversely, while any unintentional withdrawal is prevented or restrained. Also it will be noted that, if this lateral snap-in assembly method is used, it is the groove 22 on the guide bar 20 which will be deformed on assembly or withdrawal and not the rib 16 or 17, so that adjacent bars already in position will not be affected or accidentally displaced.

As shown in FIG. 1 the guide bars 20, mounted between the pairs of support rails, have their grooves 21 facing towards each other so that each vertically aligned pair of guide bars can receive and locate a printed circuit board (not shown) introduced laterally lengthwise so as to stand vertically. To identify the particular board positions, a resilient plastics identification strip 25 can be slid or snapped on to the bead or rail 16 of the top front support rail 11, so that one identification number will be present opposite each board position. As an alternative to the identification strip 25, although less preferred, there may be provided separate C-Clips, such as conventional cable markers as used in electrical wiring installations.

Figure 2:
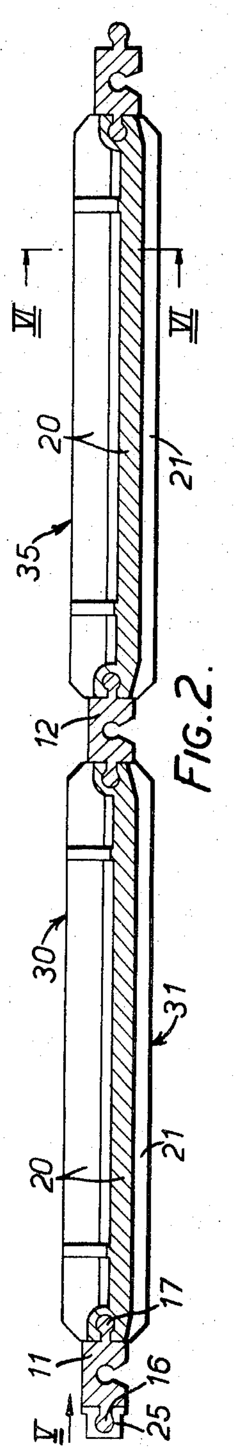
FIG. 2 is a sectional end elevation through part of a typical frame construction with two horizontal card banks or racks.
Figure 3:
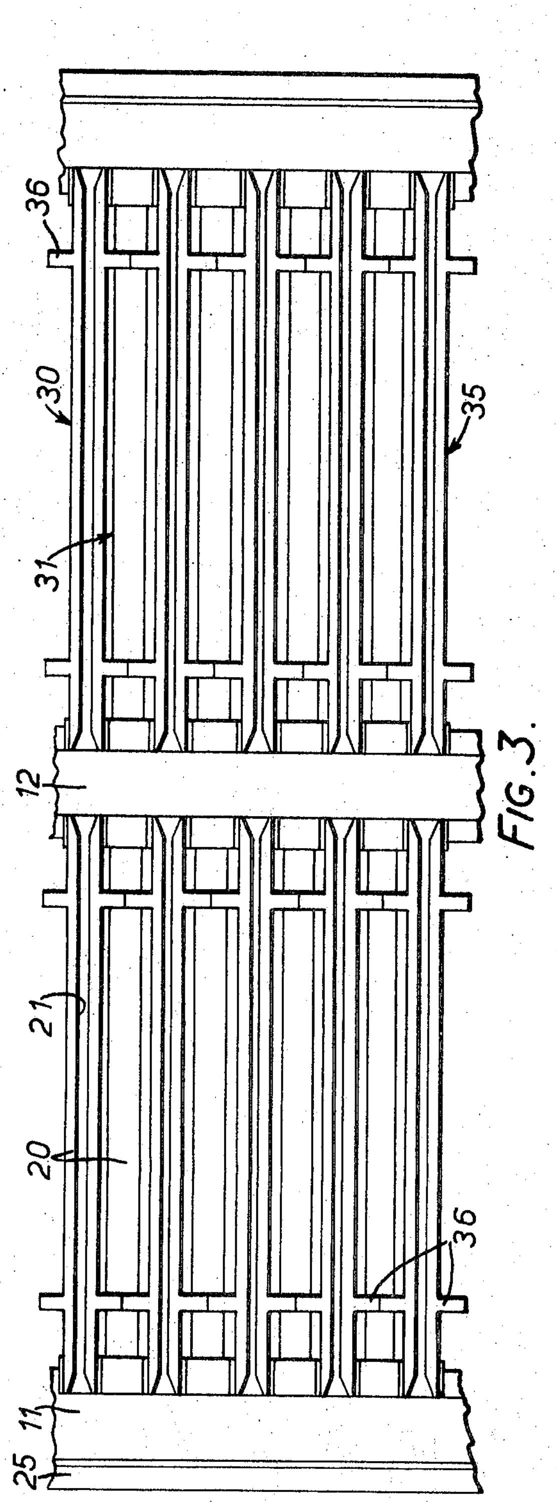
FIG. 3 is a fragmentary plan view of the construction of FIG. 2.
Figure 5:
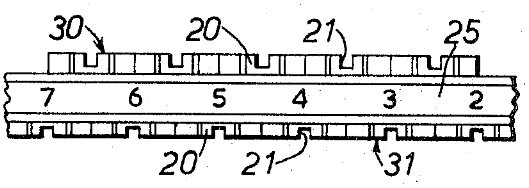
FIG. 5 is a front view in the direction of the arrow V in FIG. 2.
Figures 6, 7:
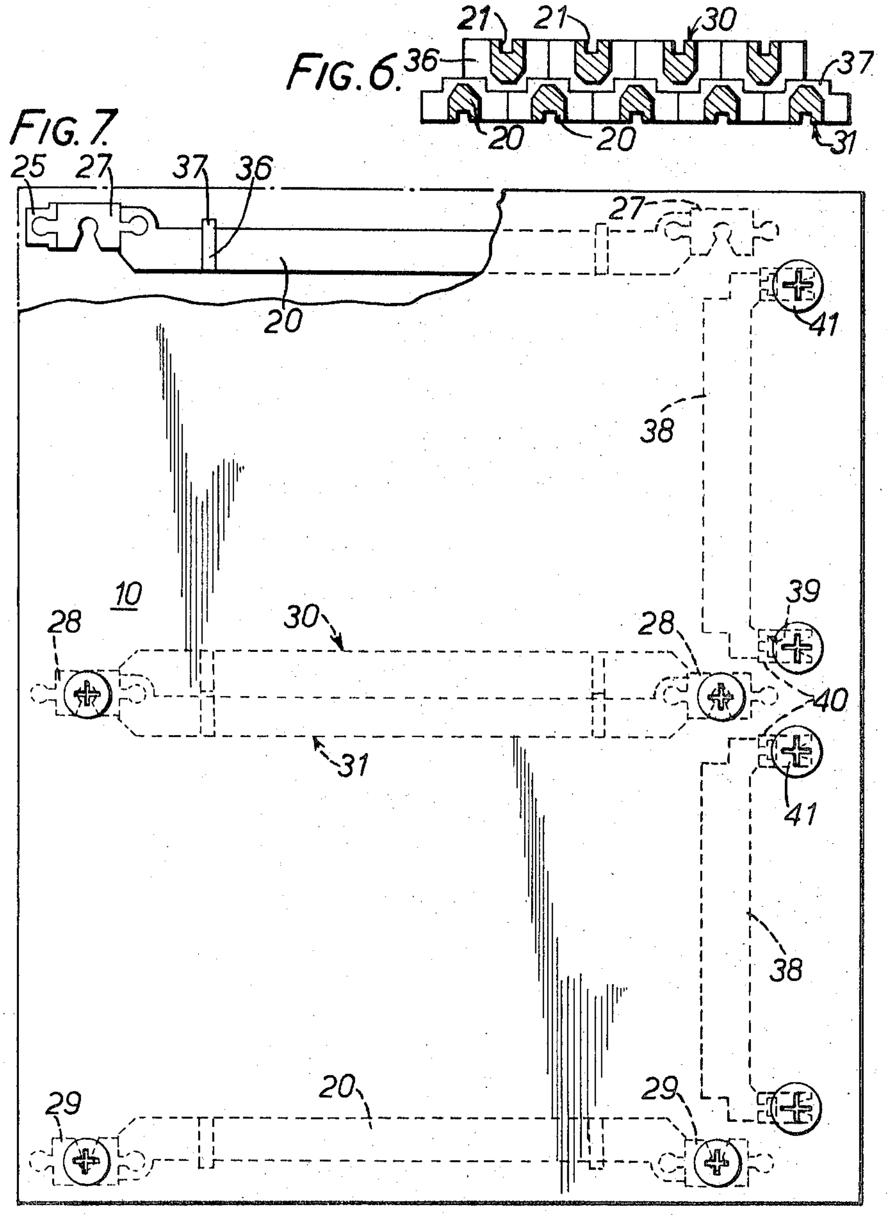
FIG. 6 is a cross-sectional view on the line VI—VI in FIG. 2 showing the spacer projections provided on adjacent guide members.
FIG. 7 is an end view of another embodiment of the invention showing three levels of support rails to provide two vertical banks or tiers of printed circuit boards.

In the FIG. 1 embodiment all the guide bars 20 at the top rail are arranged with their grooves 21 facing downwards, to provide a single horizontal tier or rack for the boards. In some examples, however, the boards may be arranged in two or more vertical levels. For example, as illustrated in FIG. 7 there may be three pairs of support rails 27,28,29 at three different heights. The guide bars 20 at the top level will have their grooves 21 facing downwards and the guide bars 20 at the bottom level will have their grooves 21 facing upwards. At the intermediate level the guide bars are arranged alternately in positions 30 and 31 with their grooves 21 facing upwards and downwards, to cooperate with the guide bars at the top and bottom levels. These alternate positions 30 and 31 are typically illustrated in FIGS. 2, 3, 5 and 6. To permit this alternate arrangement the support rails 11,12 are symmetrical at each opposite face about the horizontal center line 33 (see FIG. 8). Thus each guide bar can simply be inverted as required. It is therefore unnecessary to manufacture and supply guide bars of different designs for the different attitudes. Similarly it will be noted that each support rail is symmetrical about the vertical center line 34 and it follows that the same support rail can be used to form multiple horizontal racks with further guide bars extending horizontally, as illustrated at 35 in FIGS. 1, 2 and 3. Either bead or rail 16,17 can be used for the identification strip 25. It will be appreciated that where a plurality of horizontal racks are to be formed, the guide bars 20 in the intermediate levels may each be formed with a groove 21 in the top and bottom edge so that it is not necessary to have guide bars with a single groove 21 in alternating positions.

Figure 11:
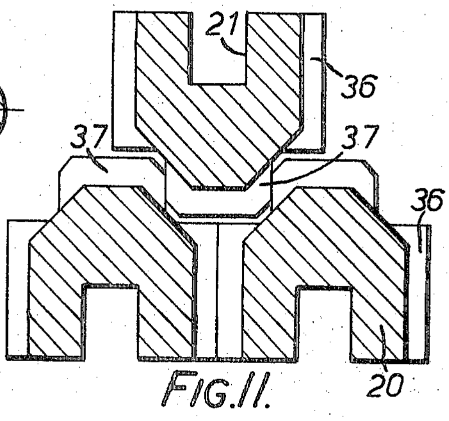
FIGS. 9, 10 and 11 are sectional views through adjacent guide bars for the embodiment of FIG. 7; illustrating three different spacings which may be provided for alternate upright and inverted bars.
Figure 9:
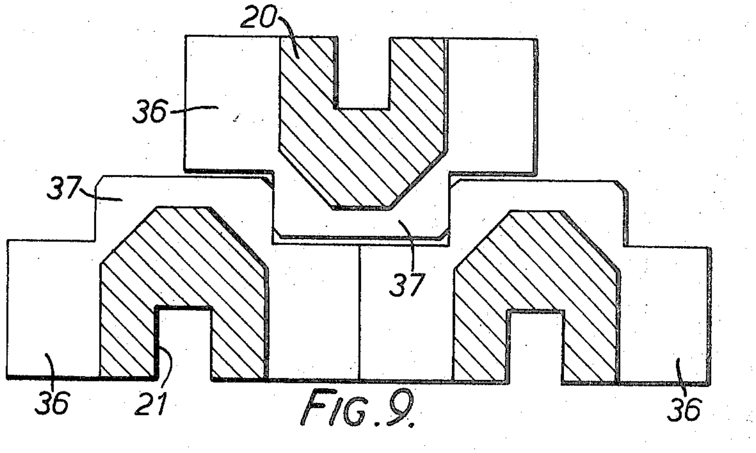
Figure 10:
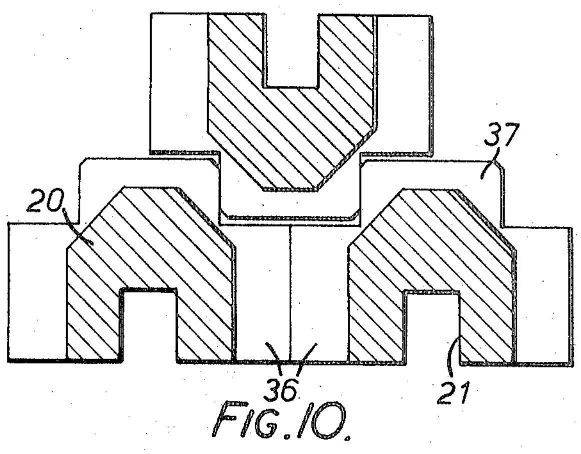

When the guide bars are positioned alternately upwards and downwards as shown at 30 and 31 in FIG. 7 the spacing between adjacent bars facing in any one direction will be considerably greater than when all the bars face in the same direction, unless special spacers are provided to space apart the bars when they all face in the same direction. Different minimum spacings may be specified for different applications and this may necessitate fairly large numbers of components being held in stock. To avoid this, the difficulty is solved by forming each bar with an integral lateral projection flange 36 at each side adjacent each end and an abutting flange 37 on the base of the bar (see FIGS. 9 to 11 and FIGS. 3, 6 and 7). When the guide bars are assembled, the projections 36 of the alternate bars with grooves facing upwards engage one another, and similarly for the alternate bars facing downwards. The base flanges 37 on alternate bars are also located between the base flanges 37 of the bars facing in the opposite direction. This arrangement provides the required minimum spacing, of, say, 0.5 inch (FIG. 9), 0.4 inch (FIG. 10), or 0.3 inch (FIG. 11) between adjacent bars on either side. This arrangement wherein alternate guide bars 20 are positioned to face in opposite directions but are attached to the same support rail produces a significant saving in vertical spacing as compared with a conventional system wherein separate sets of support rails are provided one above each other, for the guide bars, in a multiple tier arrangement.

Where the grooves 21 of the bars overlap in adjacent bars of the alternating arrangement, as shown in FIGS. 10 and 11, the end of the bar, containing the groove 22, will have to be reduced to the same width as the base flanges 37. If the same bars are assembled all facing in the same direction, as shown in FIG. 1, the same minimum spacing is achieved. It will be appreciated that for the alternating arrangement, only the base flanges 37 are necessary to ensure the correct spacing of the guide bars 20.

FIG. 7 also shows edge connectors 38 whereby electrical connections may be made to a printed circuit board slid between the guide bars 20. These end connectors are held in place by screws whose heads may be slid into the groove 39 in the support rail 40 which is located by screws 41 through end plates 10.

We claim:

1. A frame assembly for printed circuit boards comprising at least two elongated support members mounted in spaced parallel relation to one another, each of said support members having at least one rib protruding therefrom and extending along said support member in the direction of elongation thereof, each rib having an enlarged bead thereon, the ribs of the two support members being located in the same plane, and a plurality of transverse guide members supported by said support members, each of said guide members defining a slot for receiving an edge of a printed circuit board, each guide member having a pair of grooves, offset from said slot to allow entry of a printed circuit board into said slot, the grooves being positioned at extreme opposite ends of said guide member and facing directly away from each other, the grooves being formed with shaped undercut lateral enlargements to form the shape of the groove to cooperate with the complementarily shaped enlarged bead on said support member thereby forming a snap-in connection to provide rigid support for the guide member to prevent unintentional withdrawal of said cooperating rib and groove formations from one another.

2. The frame assembly of claim 1 wherein the support members are symmetrical in lateral cross-section and provided with a protruding rib at each side of the line of symmetry enabling multiple side-by-side assemblies of guide members to be assembled.

3. The frame assembly of claim 2 wherein one rib of a support member carries the one ends of the guide members and the other rib of the support member carries an identification strip having a groove shaped to fit on said rib, said strip carrying identification symbols positioned adjacent respective ones of the guide members.

4. A frame assembly comprising at least two elongated parallel spaced support members, one at each side of the assembly, and a plurality of transverse guide members each defining a slot for receiving an edge of a printed circuit board, said guide members having first locating means formed at each opposite end thereof, which locating means are offset from said slots to allow entry of a printed circuit board, and the support members having second locating means formed to cooperate with the first locating means to provide support for the guide member, said first and second locating means providing rib and groove arrangements each having symmetrical configurations to permit the guide members to be located, side-by-side, on the support members, with all the groove arrangements at each end of the assembly being located on a single rib at the respective ends of the assembly, in either an upright or in an inverted position relative thereto so that printed circuit boards can be supported in alternative positions relative to the support members.

5. The frame assembly of claim 4 wherein spacer projections are formed integral with at least some of said guide members and extend from the sides of the guide members to ensure desired spacings between the guide members in the assembly when either in one attitude or alternating in upright and inverted attitudes.

6. The frame assembly of claim 4 wherein spacer projections are formed integral with at least some of said guide members and each extend in a direction opposed to said respective slots to ensure desired spacings between guide members in the assembly when mounted in alternating upright and inverted attitudes.

7. The frame assembly of claim 4 wherein spacer projections are formed integral with at least some of said guide members and extend from the sides of the guide members and in a direction opposed to said respective slots to ensure desired spacings between a row of guide members all in one attitude and the same spacing between guide members facing in any one direction in a row when the guide members alternate in upright and inverted attitudes.

8. The frame assembly of claim 4 wherein the guide members are supported in a row on said support members, the guide members in said row alternating respectively between inverted and upright positions.

9. The frame assembly of claim 4 wherein spacer projections are formed integral with at least some of said guide members for abutment against adjacent guide members to determine the spacing therebetween, the spacer projections being of various different widths providing varying spacing between guide members.

10. The frame assembly of claim 9 wherein said spacer projections comprise flanges displaced from the ends of the guide member and situated at selected positions to the sides of and below said slot.

* * * * *